US012320373B2

(12) United States Patent
Rannow et al.

(10) Patent No.: US 12,320,373 B2
(45) Date of Patent: Jun. 3, 2025

(54) SYSTEM AND METHODS FOR CONTROLLED LOWERING AND LIFTING OF A LOAD

(71) Applicant: DANFOSS POWER SOLUTIONS II TECHNOLOGY A/S, Nordborg (DK)

(72) Inventors: Michael Berne Rannow, Eden Prairie, MN (US); Vishal Vijay Mahulkar, Eden Praire, MN (US)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/054,654

(22) Filed: Nov. 11, 2022

(65) Prior Publication Data

US 2023/0075340 A1 Mar. 9, 2023

Related U.S. Application Data

(63) Continuation of application No. 16/740,682, filed on Jan. 13, 2020, now Pat. No. 11,566,399, which is a (Continued)

(51) Int. Cl.
*F15B 19/00* (2006.01)
*E02F 9/24* (2006.01)

(52) U.S. Cl.
CPC .............. *F15B 19/005* (2013.01); *E02F 9/24* (2013.01); *F15B 2211/3057* (2013.01); (Continued)

(58) Field of Classification Search
None
See application file for complete search history.

(56) References Cited

U.S. PATENT DOCUMENTS 4,437,295 A * 3/1984 Rock .................... A01D 41/141 56/208
4,846,283 A 7/1989 Batcheller
(Continued)

FOREIGN PATENT DOCUMENTS

EP 1574627 9/2005
WO 99027197 6/1999

OTHER PUBLICATIONS

International Search Report and Written Opinion of PCT/US2013/074945 mailed Mar. 17, 2014.

*Primary Examiner* — Kenneth Bomberg
*Assistant Examiner* — Michael Quandt
(74) *Attorney, Agent, or Firm* — Merchant & Gould P.C.

(57) ABSTRACT

A system and method for the controlled lowering and lifting of a load are disclosed. The system and method may include operating a work machine having a hydraulic system including a hydraulic actuator for supporting a load, a first control valve in fluid communication with the actuator, and a controller for operating the first control valve. In one embodiment, the controller includes a first algorithm for operating the first control valve in a load lowering operation. When an operational fault within the hydraulic system is detected, the controller can be configured to enter into a safe lowering mode. In the safe lowering mode, the first algorithm is disabled and a pulse width modulation (PWM) current is sent from the controller to the first control valve. A user interface is provided to allow an operator to control the PWM current duty ratio to allow the load supported by the actuator to be lowered.

7 Claims, 8 Drawing Sheets

Related U.S. Application Data continuation of application No. 14/106,112, filed on Dec. 13, 2013, now Pat. No. 10,533,304.

(60) Provisional application No. 61/737,607, filed on Dec. 14, 2012.

(52) U.S. Cl.
CPC . *F15B 2211/427* (2013.01); *F15B 2211/7053* (2013.01); *F15B 2211/8752* (2013.01)

(56) References Cited

U.S. PATENT DOCUMENTS

| | | | | |
|---|---|---|---|---|
| 4,863,337 | A | 9/1989 | Ishiguro | |
| 4,969,527 | A | 11/1990 | Boe et al. | |
| 5,421,416 | A | 6/1995 | Orbach et al. | |
| 5,704,200 | A | 1/1998 | Chmielewksi, Jr. | |
| 6,058,343 | A | 5/2000 | Orbach | |
| 6,092,784 | A | 7/2000 | Kalfsbeck | |
| 6,561,076 | B2 * | 5/2003 | Hou | A01B 63/00 701/50 |
| 2011/0153169 | A1 | 6/2011 | Peterson | |
| 2011/0208362 | A1 | 8/2011 | Alstrin | |
| 2012/0232756 | A1 | 9/2012 | Yuan | |
| 2013/0255214 | A1 * | 10/2013 | Nafziger | A01D 47/00 56/208 |

* cited by examiner

SYSTEM AND METHODS FOR CONTROLLED LOWERING AND LIFTING OF A LOAD

CROSS REFERENCE TO RELATED APPLICATION

This application is a continuation application of application Ser. No. 16/740,682, filed Jan. 13, 2020, which is a continuation of application Ser. No. 14/106,112, filed Dec. 13, 2013. Application Ser. No. 14/106,112 claims priority to U.S. Provisional Patent Application Ser. No. 61/737,607, filed on Dec. 14, 2012, to the extent appropriate. The entirety of U.S. Ser. No. 16/740,682, U.S. Ser. No. 14/106,112 and U.S. 61/737,607 are incorporated by reference herein. A claim of priority is made to each of U.S. application Ser. Nos. 16/740,682, 14/106,112 and 61/737,607 to the extent appropriate.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. In such electro-hydraulic systems, the added reliance on such components has led to the increased prevalence of system faults. Although many such faults can be detected, the faults are often difficult to identify or isolate due to the complex nature of electro-hydraulic systems. Automated procedures exist to test different components to isolate unknown faults, but their execution can be dangerous if an actuator is not in a safe state, such as when a load is suspended above the ground by the work machine. Accordingly, it is sometimes desired to place the work machine in a safe state before running such diagnostics. However, as the fault may actually reside within the system responsible for lowering the load, placing the system in a safe state using the normal operating algorithms may be hazardous. It is also sometimes necessary to lift a load even though there are known faults within the system which also can be hazardous. Improvements are desired.

SUMMARY

A system and methods for the controlled lowering and lifting of a load are disclosed. The system and method may include operating a work machine having a hydraulic system including a hydraulic actuator for supporting a load, a first control valve in fluid communication with the actuator, and a controller for operating the first control valve. In one embodiment, the controller includes a first algorithm for operating the first control valve in a load lowering operation. When an operational fault within the hydraulic system is detected, the controller can be configured to enter into a safe lowering mode. The safe lowering mode may be initiated automatically, or may be initiated by an operator through a user interface. In the safe lowering mode, the first algorithm is disabled and a pulse width modulation (PWM) current is sent from the controller to the first control valve. A user interface is provided to allow an operator to control the PWM current duty ratio to allow the load supported by the actuator to be lowered.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
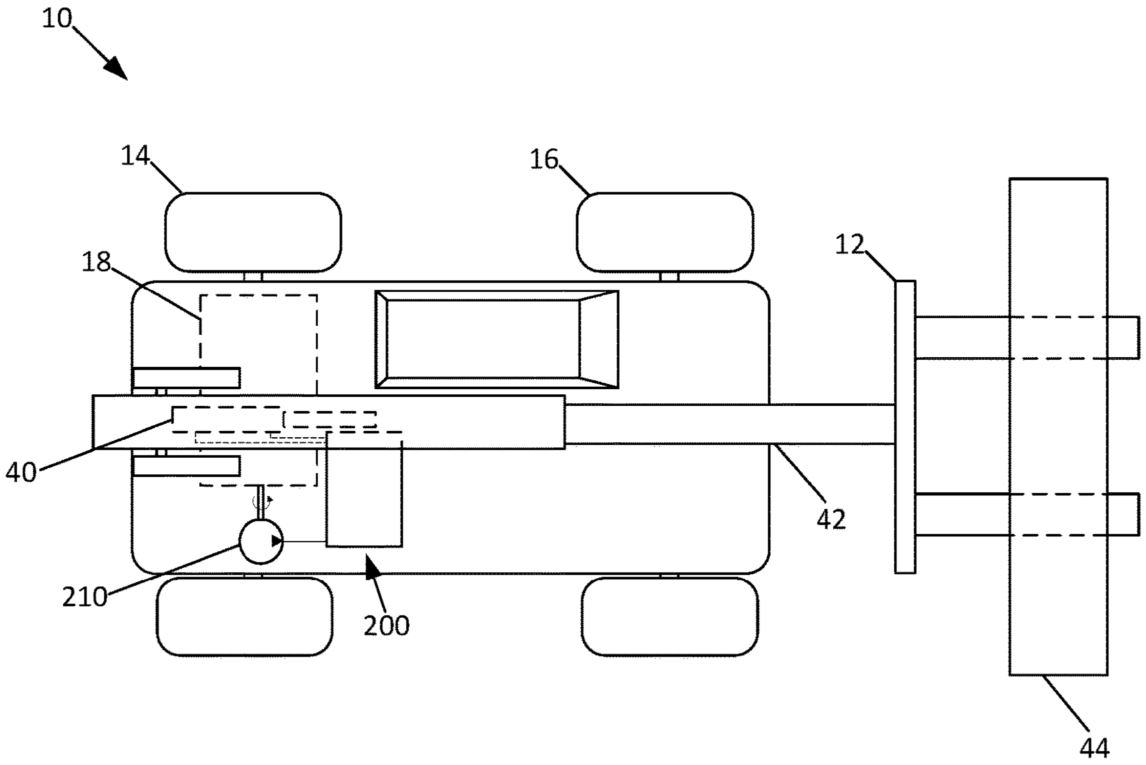
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a hydraulic system including a work circuit 200 and a steering circuit (not shown) of the work machine 10 via at least one hydraulic pump 210. In one embodiment, pump 32 is mechanically coupled to the engine 18, such as by an output shaft or a power take-off. In one embodiment, pump 210 is powered indirectly by the engine 18 via a hydraulic system. The work circuit 200 actuates the work attachment 12 by operation of the pump in cooperation with a number of hydraulic actuators 40 and control valves 20, 120 (shown at FIG. 2). In one embodiment, the work machine includes hydraulic actuators and valves for effectuating lifting, extending, tilting, and sideways motions of the work attachment 12.

Hydraulic System

Figure 2:
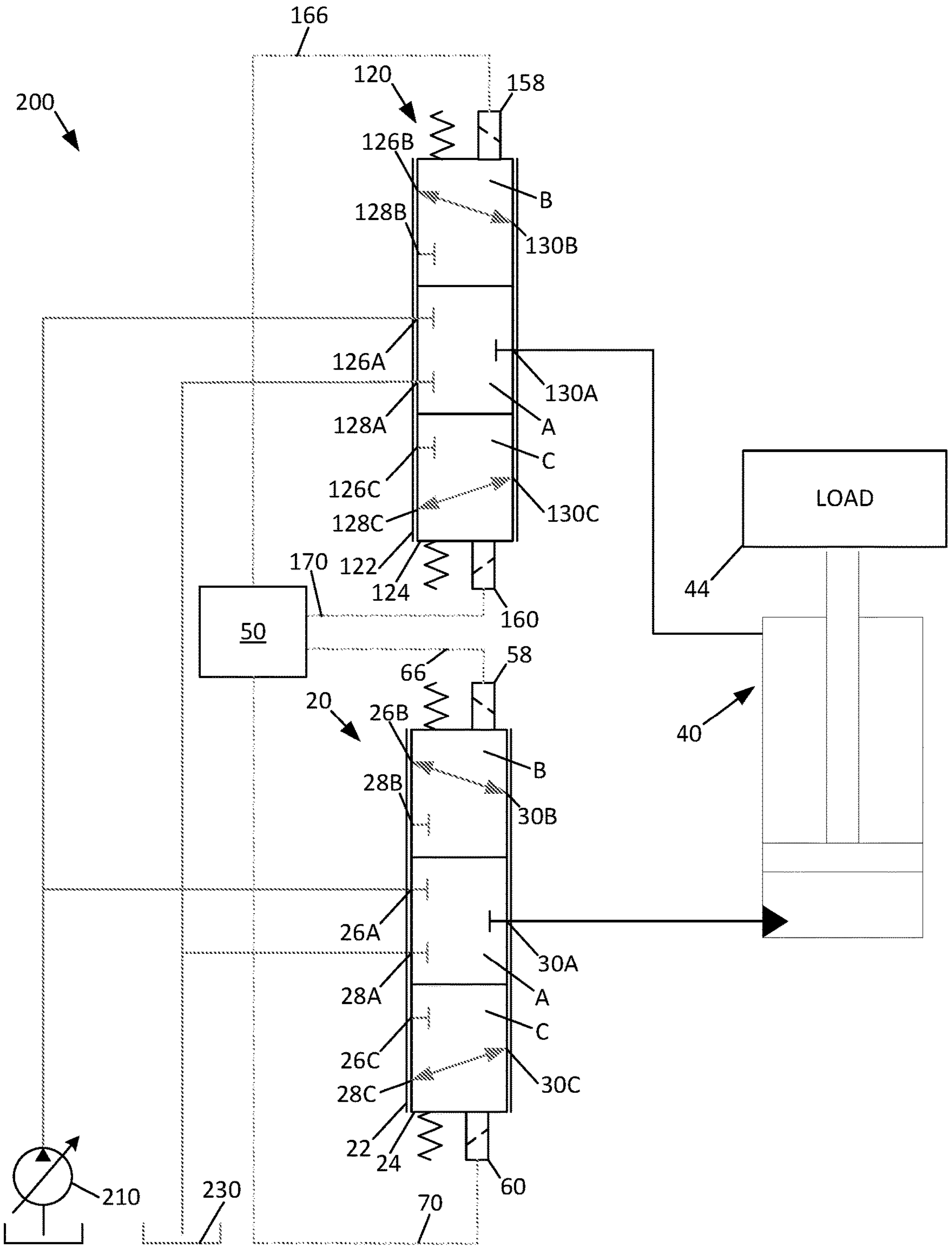
FIG. 2 is a schematic view of a portion of a hydraulic system including a work circuit suitable for use in the work machine shown in FIG. 1.

Referring to FIG. 2, an example of a hydraulic system including a work circuit 200 and other components are shown. Work circuit 200 is for activating a work attachment of a work machine. As shown, work circuit 200 includes a first valve assembly 20 and a second valve assembly 120 for enabling a work function, such as an attachment lift function. Work circuit 200 may also include a plurality of additional valves and/or fluid power consuming components for enabling other functions in the hydraulic system. Furthermore, the work circuit may include a single valve assembly that combines the functions of the first and second valve assemblies 20, 120. In the particular embodiment shown, the first and second valve assemblies 20, 120 are proportional valves having a sleeve 22, 122 within which a spool 24, 124 is disposed.

The first valve assembly 20 is configured and arranged to selectively provide pressurized fluid from pump 210 to one or more hydraulic lift or work cylinders 40 which are mechanically coupled to the work attachment. Although cylinders 40 are characterized in this disclosure as being lift cylinders, it should be understood that cylinders 40 may be any type of actuator, such as a hydraulic motor or other type of linear actuator, and that the disclosure is not limited to only applications involving lift cylinders. The operation of first valve assembly 20 causes the work attachment 12 to be selectively raised or lowered in a lifting function. The lifting speed of the lift cylinder(s) 40 is a result of the flow through the first valve assembly 20. Flow through the first valve assembly 20 can be controlled by a pair of variable solenoid actuators 58, 60 acting on each end of the spool 24 of the valve 20. The variable solenoid actuators 58, 60 can be operated by the control system 50 via control lines 66, 70, respectively. The valve assemblies can also be two-stage valves in which a pilot valve is controlled by a solenoid/voicecoil and the main stage valve is controlled by pressure from the pilot stage. In such a case, the disclosed safe lower procedure is beneficial as a fixed current to the pilot valve results in a fixed speed of the main stage valve rather than a fixed position.

As shown, the first valve assembly 20 is a three-position, three-way valve in fluid communication with the pump 210, a tank reservoir 230, and the lift cylinder(s) 40. A single four way valve controlling an actuator instead of two three-way valves (20, 120) may also be used. In the embodiment shown, first valve assembly 20 is movable from a closed or neutral position A, to a lifting position B, and to a lowering position C.

In the closed position A, ports 26A, 28A, and 30A are closed such that the pump 210 and tank reservoir 230 are both isolated from the lifting cylinder(s) 40. In this position the work attachment 12 is held in a static position and can be neither raised nor lowered.

In the lifting position B, the first valve assembly 20 is positioned such that ports 26B and 30B are placed in fluid communication with each other. This position allows for the pump 210 to be placed in fluid communication with the lifting cylinder(s) 40. Where the pump pressure exceeds the pressure induced by a load 44, the hydraulic lift cylinder(s) will cause the load 44 to be raised. In the lifting position, the tank reservoir 230 is blocked at port 28B.

In the lowering position C, the first valve assembly 20 is positioned such that ports 28C and 30C are placed in fluid communication with each other. This position allows for the tank reservoir 230 to be placed in fluid communication with the lifting cylinder(s) 40. The lowering position C allows for fluid to drain from the lifting cylinder(s) 40 to the tank reservoir 230, thereby allowing for the load 44 to be lowered.

The second valve assembly 120 is configured and arranged to selectively provide fluid communication between the pump 210 or reservoir 230 and one or more hydraulic lift or work cylinders 40 which are mechanically coupled to the work attachment. The operation of second valve assembly 120 allows for hydraulic fluid to causes the work attachment 12 to be selectively raised or lowered in a lifting function. The lowering speed of the lift cylinder(s) 40 can be a result of the flow through the second valve assembly 120. Flow through the second valve assembly 120 can be controlled by a pair of variable solenoid actuators 158, 160 acting on each end of the spool 124 of the valve 120. The variable solenoid actuators 158, 160 can be operated by the control system 50 via control lines 166, 170, respectively.

As shown, the second valve assembly 120 is a three-position, three-way valve in fluid communication with the pump 210, a tank reservoir 230, and the lift cylinder(s) 40. In the embodiment shown, second valve assembly 120 is movable from a closed or neutral position A, to a lifting position B, and to a lowering position C.

In the closed position A, ports 126A, 128A, and 130A of the second valve assembly 120 are closed such that the pump 210 and tank reservoir 230 are both isolated from the lifting cylinder(s) 40. In this position, no flow can pass through the valve, and the load cannot be raised. In one operational control scheme, the second valve assembly 120 would be in the closed position A when the first valve assembly 20 is also in its closed position A.

In the lowering position B, the second valve assembly 120 is positioned such that ports 126B and 130B are placed in fluid communication with each other. This position allows for the pump 210 to be placed in fluid communication with the lifting cylinder(s) 40 such that pump can provide fluid power to lower the load beyond what would be achieved by gravity alone. In the lowering position, the tank reservoir 230 is blocked at port 28B. In one operational control scheme, the second valve assembly 120 would be in the lowering position B when the first valve assembly 20 is also in its lowering position C.

In the lifting position C, the second valve assembly 120 is positioned such that ports 128C and 130C are placed in fluid communication with each other. This position allows for the tank reservoir 230 to be placed in fluid communication with the lifting cylinder(s) 40. The lifting position C allows for fluid to drain from the rod side of the lifting cylinder(s) 40 to the tank reservoir 230, thereby allowing for the load 44 to be raised. In one operational control scheme, the second valve assembly 120 would be in the lifting position C when the first valve assembly 20 is also in its lifting position B.

The Electronic Control System

The hydraulic system operates in various modes depending on demands placed on the work machine (e.g., by an operator). The electronic control system monitors and allows for the various modes to be initiated at appropriate times.

An electronic controller 50 monitors various sensors and operating parameters of the hydraulic system to configure the hydraulic system into the most appropriate mode. Examples of operational modes are a work circuit lifting mode and a safe lower mode.

Figure 3:
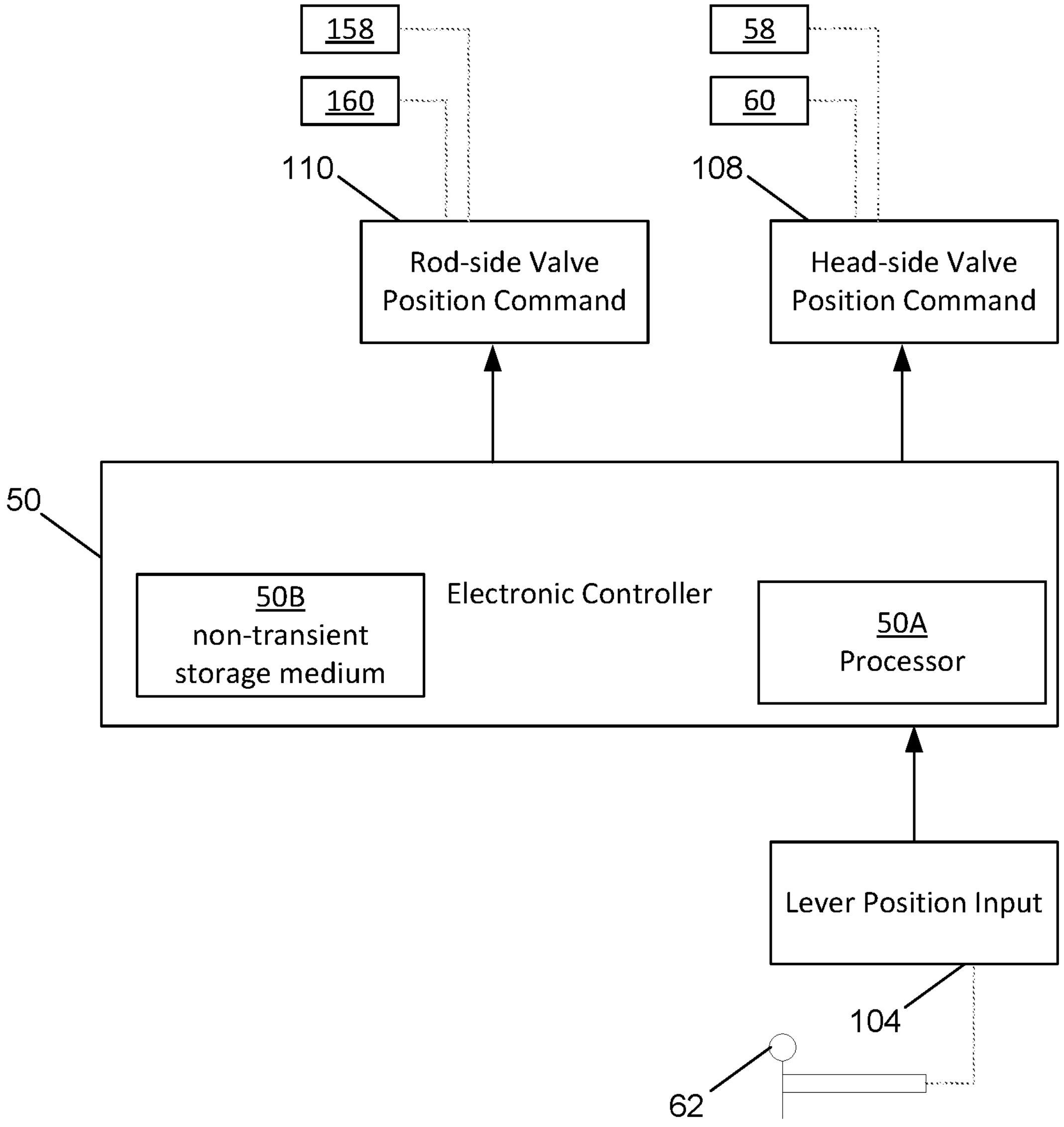
FIG. 3 is a schematic of an electronic control system for the hydraulic circuit shown in FIG. 2.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for implementing the work circuit lifting mode and the work circuit safe lower mode. For example, inputs and outputs may be in the form of pressure and position sensors on the first and second control valves 20, 120. Another example of an input is engine speed, which may be provided as a direct input into the electronic controller 50 or may be received from another portion of the control system via a control area network (CAN). The measured pump displacement, for example via a displacement feedback sensor, may also be provided.

One input into the electronic controller 50 is the input 104. Input 104 may be from a variety of sources, for example and automated controller without any human interaction or a signal from a lifting lever 62. In one embodiment, the lever position input is a direct digital signal from an electronic lever. The lifting lever 62 provides a user indication to the controller 50 that a load lifting operation by hydraulic lift cylinder(s) 40 is desired and also provides a means to control the raising and lowering of the load 44. Although lever 62 is characterized as a lifting lever, it should be understood that the disclosure is not limited to only lifting levers and that lever 62 can be any type of work lever without departing from the concepts disclosed herein.

Still referring to FIG. 3, a number of outputs from the electronic controller 50 are shown. One output is a valve position command 108 to the first control valve 20. In the particular embodiment shown, the valve command output 108 is a proportional signal to the solenoid valves 58, 60 of control valve 20 via control lines 66, 70. Another output is a valve position command 110 to the second control valve 120. In the particular embodiment shown, the valve command output 110 is a proportional signal to the solenoid valves 158, 160 of control valve 120 via control lines 166, 170.

The electronic controller 50 may also include a number of algorithms or control schemes to correlate the inputs and outputs of the controller 50. In one embodiment, the controller 50 includes an algorithm to control the system in a work mode and a safe lower mode, as described further in the Method of Operation section below.

The electronic controller 50 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Method of Operation

Figure 4:
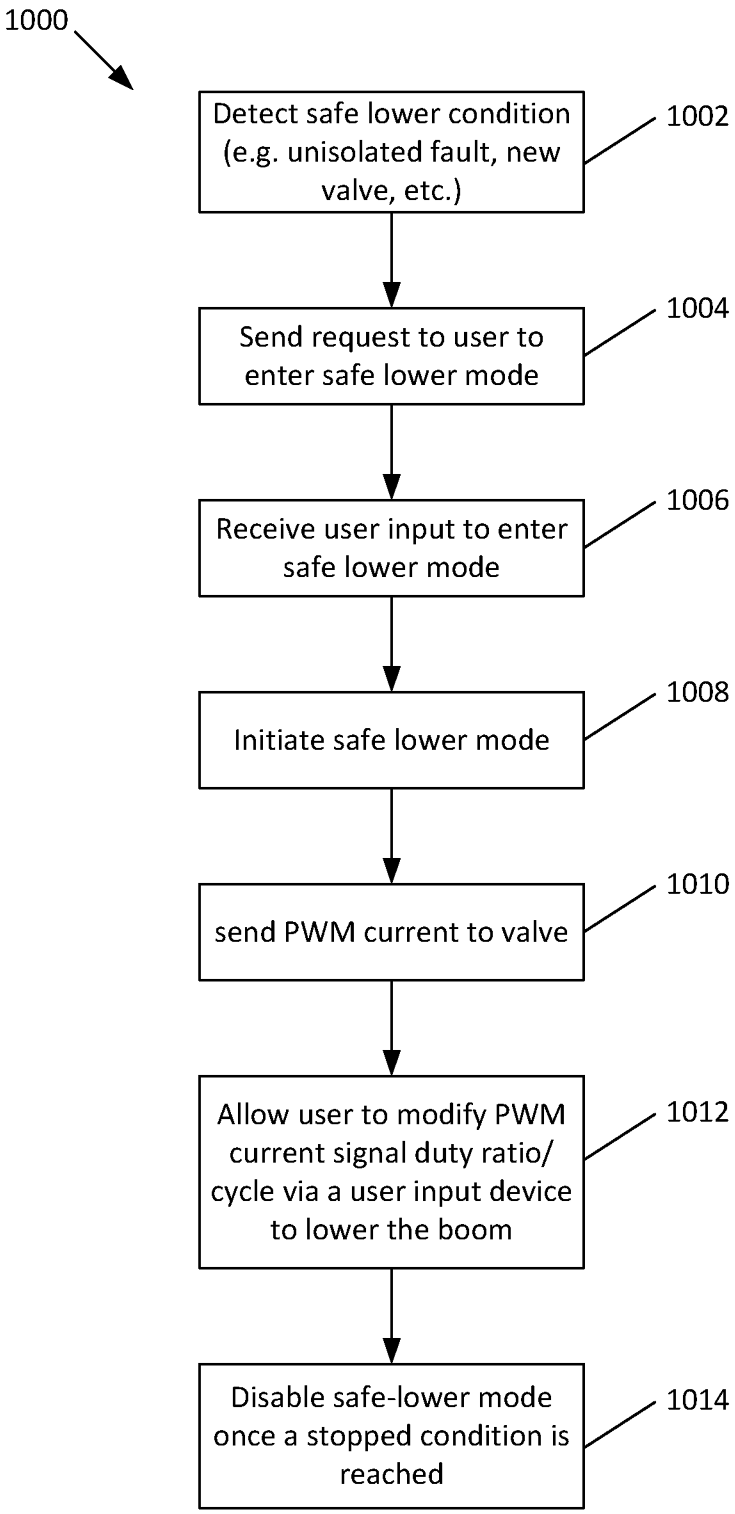
FIG. 4 is a process flow chart showing a safe lowering mode of operation of the work circuit shown in FIG. 2.

Referring to FIG. 4, a method 1000 of operating the work circuit 200 is shown. It is noted that although FIG. 4 diagrammatically shows the method steps in a particular order, the method is not necessarily intended to be limited to being performed in the shown order. Rather at least some of the shown steps may be performed in an overlapping manner, in a different order and/or simultaneously.

In a first step 1002 of the method 1000, the electronic controller 50 detects a safe lower condition, for example an un-isolated fault somewhere within the controller 50, the work circuit 200, or another related system associated with work machine 10. Because many electro-hydraulic systems may contain complex algorithms dependent upon a large number of sensors and inputs, many faults are not able to be isolated in real-time. As such, step 1002 reflects the initial condition where it is known that a fault has occurred, but it is not known what component(s) are actually responsible for triggering the fault. Other safe lower conditions exist in which it is preferable to enter the safe lower mode. For example, if a new valve is installed in the system when a load is in the air, the safe lower mode can be helpful as it is possible that air would be in the hydraulic lines and the valve. Also, a new valve usually has to be initialized before being placed into operation. In such cases, it is not necessarily known whether the valve position sensor can be safely trusted, so the load needs to be lowered in a safe manner. Once the load has been lowered air can be fully bled from the system and/or the new valve can be initialized or tested.

In a second step 1004, the controller 50 sends a request to the operator of the work machine 10 to enter a safe lower mode. By use of the term "safe lower mode" it is meant to include any operational mode whereby the boom 42, work implement 12, and load 44 are able to be brought to a completely lowered state (i.e. resting on the ground or against supporting structure on the vehicle) without relying on the normal operation lowering algorithm present on the controller 50 and without relying on a potentially faulty input sensor. By lowering the load 44 without using the normal lowering algorithm, which may be relying on a component responsible for triggering the fault, the load 44 may be lowered in a relatively safer manner. The request performed in step 1004 may be sent through a machine-user interface associated with the work machine 10.

In a third step 1006, the controller 50 receives verification that the user desires to enter the safe lower mode. The verification performed in step 1006 may be sent through a machine-user interface associated with the work machine 10. Optionally, verification may be sent through use of the lever 62. It is noted that second and third steps 1004, 1006 can also be performed such that the controller 50 automatically initiates the safe lower mode without requiring input or verification from the operator via a user input. In such a configuration, the method can include the step of providing an indication to the operator that a fault has been detected and that the safe lower mode will be initiated. It is noted that steps 1004 and 1006 may be engaged automatically by an automated controller without human interaction such that step 1008 (below) is initiated after step 1002. The automated controller may be provided with logic to make a determination on whether to enter the safe lower mode.

In a fourth step 1008, the safe lower mode is initiated. At this step, the controller disables the normal control algorithms for the first control valve 20, and the second control valve 120 (if present). In one embodiment, the controller 50 has a first algorithm for operating the control valve in a normal load lowering operation that is disabled in the safe lower mode. This step may include commanding the pump (s) to meet the measured load pressure in case the valve opens to the pump, where the pressure sensor can be trusted.

Figure 5:
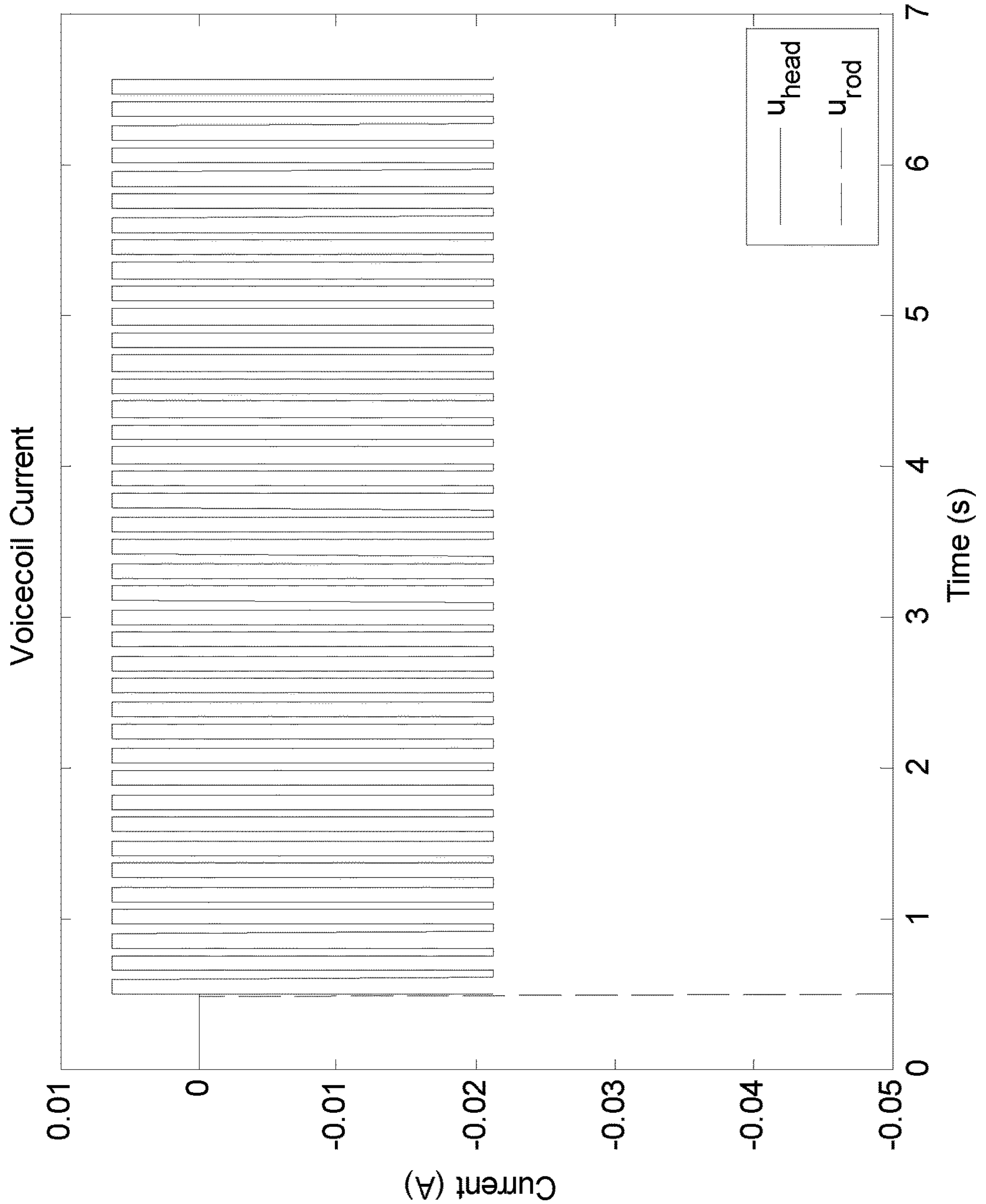
FIG. 5 is a graphical representation of pulse width modulation signals generated for a first control valve and a second control valve of the work circuit shown in FIG. 2 in the safe lowering mode.
Figure 6:
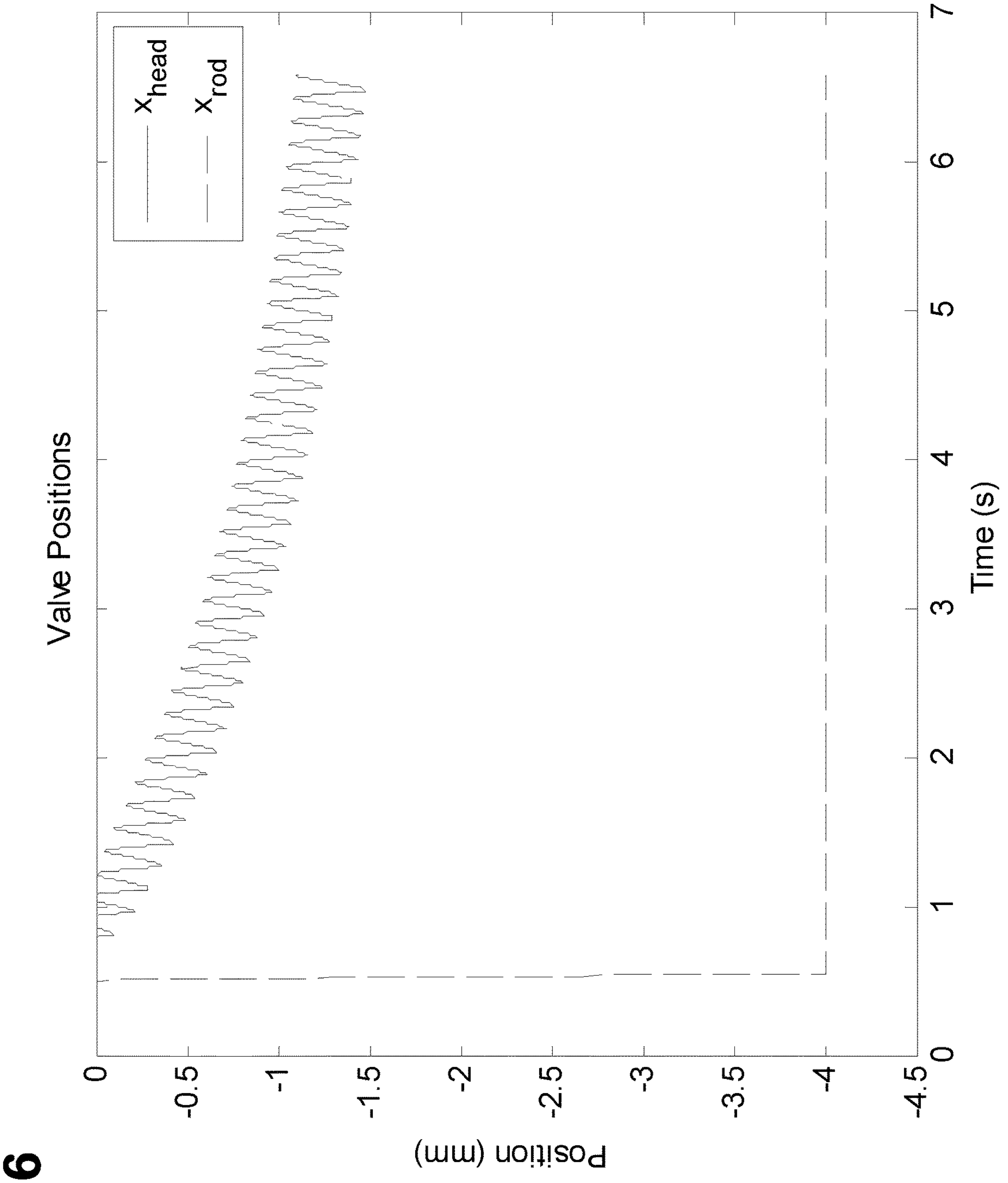
FIG. 6 is a graphical representation of spool positions for the first control valve and the second control valve of the work circuit shown in FIG. 2 in the safe lowering mode, as a result of the signal shown in FIG. 5.
Figure 7:
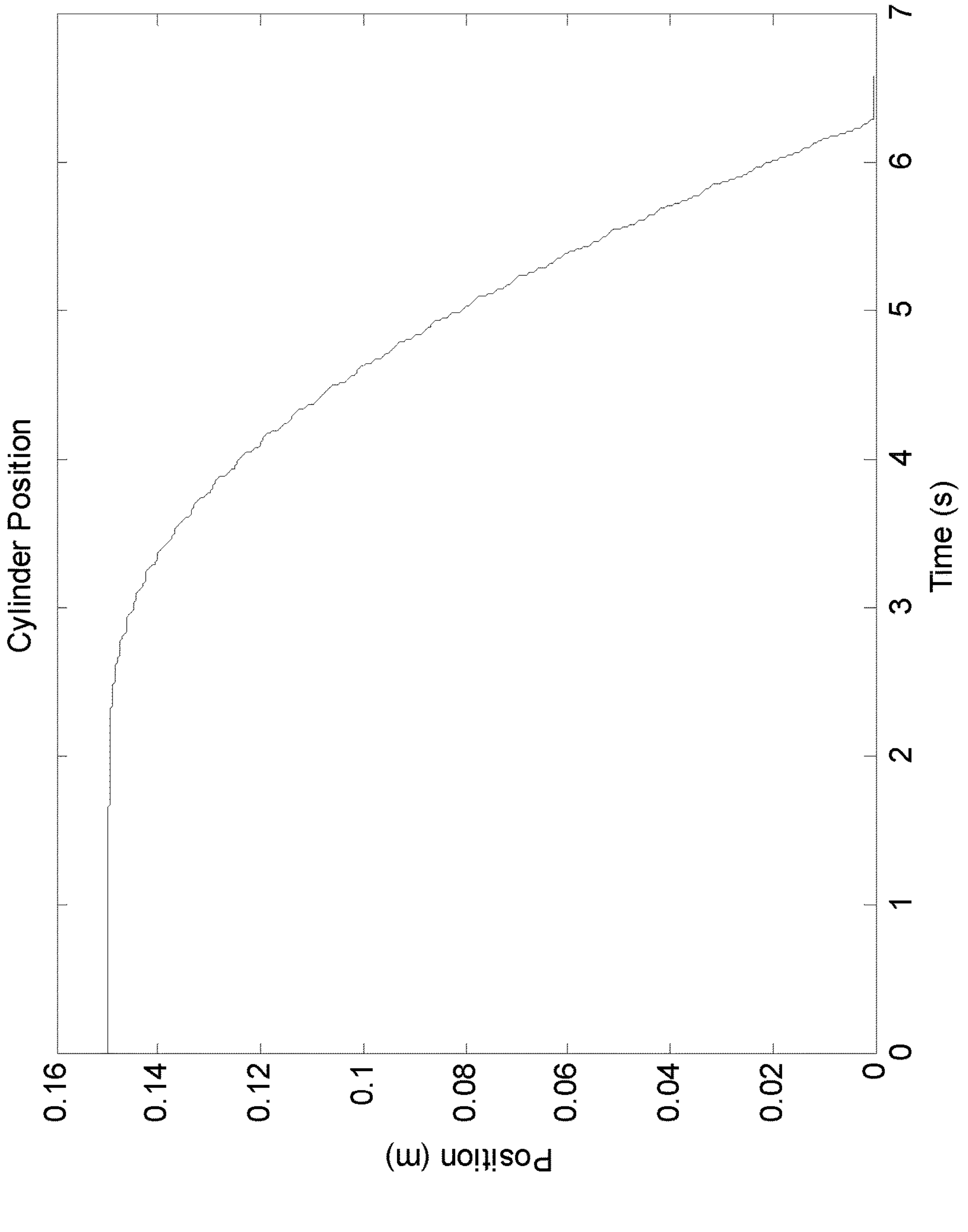
FIG. 7 is a graphical representation of a cylinder position for an actuator associated with the first control valve of the work circuit shown in FIG. 2 in the safe lowering mode, as a result of the signal shown in FIG. 5.

In a fifth step 1010, a pulse width modulation (PWM) current is sent to the valve actuator 60 of the first control valve assembly 20. The PWM current causes the first control valve assembly 20 to repeatedly move into the lowering position C such that hydraulic fluid can incrementally pass through valve 20 from actuator 40 and into the reservoir 230, thus allowing load 44 to be lowered. In one embodiment, the controller can set a minimum PWM current value that is below the current to move the valve 20 and can set a maximum PWM current value that is above the current required to move the valve 20. As can be seen at FIG. 5, the safe lower mode is entered at approximately time=0.5 seconds, and a PWM current signal to actuator 60 is introduced having an upper limit of about 0.075 Amps and a lower limit of about −0.02 Amps. FIG. 6 shows the resulting position change of the spools effectuated by the PWM signal while FIG. 7 shows the resulting actuator position. The example plots shown in FIGS. 5-7 were used with the following parameters: load of 100 bar; sample period of 150 ms; PWM high value: tank offset +8%; PWM low value: tank offset −3%; and a duty ratio of 525/1500.

The fifth step 1010 may also include sending a corresponding PWM current to actuator 58, if present, in order to center the valve 20 in an active manner. Where the valve 20 is a spring-centered valve, the control valve will also operate to self-center without the use of an additional signal. It is also noted that a negative current signal, as shown at FIG. 5, may be provided to actuators 58 (and/or 60) to effectuate activation and centering of the valve 20 as well. One skilled in the art will understand that any combination of springs and PWM current signals may be utilized without departing from the concepts disclosed herein.

The fifth step 1010 may also include control of the second control valve 120. It is noted that such control is not necessary where no valve 120 is present. In one embodiment, the second control valve 120 is commanded into the lowering position C such that fluid may flow uninhibited from the reservoir 230 and into the actuator 40. In another embodiment, actuators 158 and/or 160 are provided with a complementary PWM signal to allow for the incremental passage of hydraulic fluid from the reservoir 230 to the actuator 40. Referring to FIG. 5, the control valve 120 is commanded to the closed position A. In such an application, hydraulic fluid may be allowed to pass into the actuator 40 via anti-cavitation valves (not shown). The resulting position of the spool 124 of the valve 120 is shown at FIG. 6.

In a sixth step, 1012 the controller also allows a user input, such as lever 62, to control the duty ratio of the PWM current. The PWM current has a frequency with a period, which may be fixed with a parameter setting, and the duty ratio defines how much of each period is on and how much is off with respect to the PWM current sent to the valve 20 (and valve 120, if desired). Thus, the duty ratio can be used to control the rate at which hydraulic fluid is allowed to pass from actuator 40 to reservoir 230. Accordingly, the duty ratio determines the speed at which the load 44 is lowered. By allowing the operator to control the duty ratio, the operator is placed directly in the control loop in the safe lower mode and has complete control over the lowering of the load 44 without reliance upon potentially faulty system components. FIG. 7 shows the resulting cylinder position of the actuator 40 before and after the safe lower mode has been entered where it can be seen that the operator allowed the load to be lowered over a period of about 6.0 seconds (time=0.5 seconds to about time=6.5 seconds). In one embodiment, the controller can be configured to provide an upper limit and a lower limit on the PWM duty ratio or can be allowed to operate anywhere between 0% and 100%. Alternatively, step 1012 may include using an automatic controller to execute an algorithm to control the duty ratio of the PWM current instead of feedback from a user input. In a further step 1014, the safe-lower mode can be disabled once a stopped condition is reached which may be provided by, for example, a sensor or via a user input.

Figure 4A:
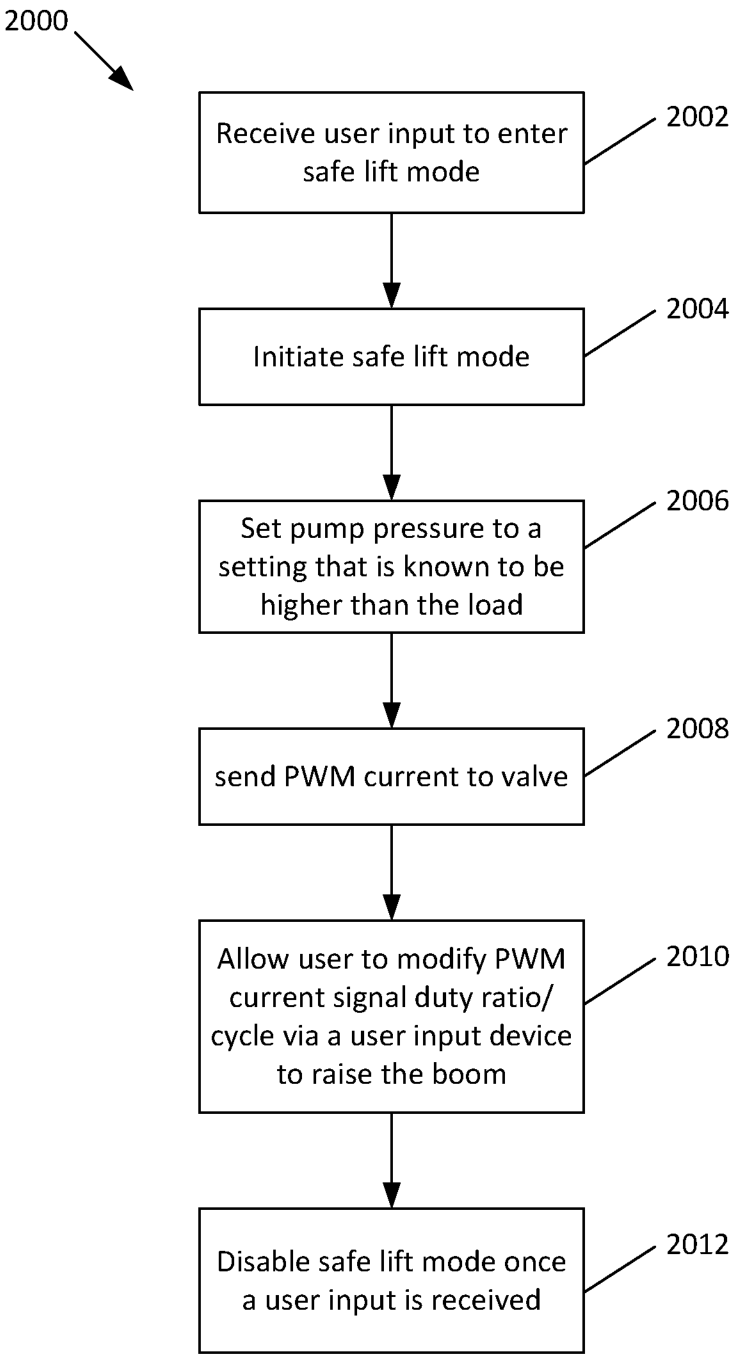
FIG. 4A is a process flow chart showing a safe lifting mode of operation of the work circuit shown in FIG. 2.

Referring to FIG. 4A, a method 2000 of operating the work circuit 200 in a safe lift mode is shown. It is noted that although FIG. 4A diagrammatically shows the method steps in a particular order, the method is not necessarily intended to be limited to being performed in the shown order. Rather at least some of the shown steps may be performed in an overlapping manner, in a different order and/or simultaneously. The method 2000 can be utilized in situations where an implement may need to be raised off the ground to tow or access some part of the machine.

In a first step 2002 of the method 2000, a user input is received at the controller 50 indicating that it is desired to enter into the safe lift mode. Step 2002 may include detecting an operational fault within the system, for example any of the faults discussed with regard to causing a safe lower condition to be initiated as discussed with respect to step 1002 of method 1000. In a step 2004, the safe lift mode is initiated by the controller 50. In one embodiment, the controller 50 has a first algorithm for operating the control valve in a normal load lifting or lowering operation that is disabled in the safe lift mode. At a step 2006, the pump pressure is set to a setting that is known to be higher than the load to ensure that the load will not be lowered once the valve is actuated.

In a step 2008, a pulse width modulation (PWM) current is sent to the valve actuator 60 of the first control valve assembly 20. The PWM current causes the first control valve assembly 20 to repeatedly move into the lifting position B such that hydraulic fluid can incrementally pass through valve 20 from pump 210 and into actuator 40, thus allowing load 44 to be raised. In one embodiment, the controller can set a minimum PWM current value that is below the current to move the valve 20 and can set a maximum PWM current value that is above the current required to move the valve 20.

The step 2008 may also include sending a corresponding PWM current to actuator 58, if present, in order to center the valve 20 in an active manner. Where the valve 20 is a spring-centered valve, the control valve will also operate to self-center without the use of an additional signal. It is also noted that a negative current signal may be provided to actuators 58 (and/or 60) to effectuate activation and centering of the valve 20 as well. One skilled in the art will understand that any combination of springs and PWM current signals may be utilized without departing from the concepts disclosed herein.

The step 2008 may also include control of the second control valve 120. It is noted that such control is not necessary where no valve 120 is present. In one embodiment, the second control valve 120 is commanded into position C such that fluid may flow uninhibited from the actuator 40 and into reservoir 230. In another embodiment, actuators 158 and/or 160 are provided with a complementary PWM signal to allow for the incremental passage of hydraulic fluid from the actuator 40 to the reservoir 230.

In a step 2010, the controller also allows a user input, such as lever 62, to control the duty ratio of the PWM current. The PWM current has a frequency with a period, which may be fixed with a parameter setting, and the duty ratio defines how much of each period is on and how much is off with respect to the PWM current sent to the valve 20 (and valve 120, if desired). Thus, the duty ratio can be used to control the rate at which hydraulic fluid is allowed to pass from pump 210 to actuator 40. Accordingly, the duty ratio determines the speed at which the load 44 is raised. By allowing the operator to control the duty ratio, the operator is placed directly in the control loop in the safe lift mode and has complete control over the lifting of the load 44 without reliance upon potentially faulty system components. In one embodiment, the controller can be configured to provide an upper limit and a lower limit on the PWM duty ratio or can be allowed to operate anywhere between 0% and 100%. Alternatively, step 2012 may include using an automatic controller to execute an algorithm to control the duty ratio of the PWM current instead of feedback from a user input. In a further step 2012, the safe lift mode can be disabled once a desired position is reached which may be provided by, for example, a sensor or via a user input.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic system, comprising:

a) a hydraulic actuator for supporting a load;

b) a control valve in fluid communication with the hydraulic actuator;

c) a controller for operating the control valve, the controller being configured to operate the control valve in a normal operational mode and a safe operational mode:

i) the normal operational mode including at least a first algorithm for operating the control valve in a load lowering operation or a load lifting operation; and ii) the safe operational mode including disabling the first algorithm and sending a pulse width modulation (PWM) current from the controller to the control valve, the PWM current having a duty ratio; and d) a machine user interface configured to provide an input to the controller to allow an operator to adjust the PWM current duty ratio to lower the load or to lift the load supported by the hydraulic actuator, wherein the PWM current has a lower limit that is below a value required to move the control valve and has an upper limit that is above the value required to move the control valve; and wherein the controller is configured to:

detect when a new valve has been added to the hydraulic system; and automatically switch to operate in the safe operational mode in response to the controller detecting the new valve.

2. The hydraulic system of claim 1, wherein the control valve is a spool and sleeve type valve operated by at least one actuator.

3. The hydraulic system of claim 2, wherein the PWM current is sent to the at least one actuator.

4. The hydraulic system of claim 1, further comprising another control valve configured to provide hydraulic fluid from a pump to the hydraulic actuator.

5. The hydraulic system of claim 4, wherein the safe operational mode includes moving the another control valve to a closed position.

6. The hydraulic system of claim 4, wherein the safe operational mode includes moving the another control valve such that fluid may flow into a reservoir.

7. The hydraulic system of claim 4, wherein the safe operational mode includes sending a PWM current from the controller to the another control valve.

* * * * *